United States Patent
Wu

(10) Patent No.: US 7,135,654 B2
(45) Date of Patent: Nov. 14, 2006

(54) ANGLE-VARIABLE OPTICAL MARKING APPARATUS

(76) Inventor: Chyi-Yiing Wu, 3 Fl., No. 48, Shih-Ping Street, Taipei (TW)

( * ) Notice: Subject to any disclaimer, the term of this patent is extended or adjusted under 35 U.S.C. 154(b) by 171 days.

(21) Appl. No.: 10/817,261

(22) Filed: Apr. 2, 2004

(65) Prior Publication Data

US 2005/0194366 A1  Sep. 8, 2005

(30) Foreign Application Priority Data

Mar. 4, 2004  (TW)  ............................... 93203201 U

(51) Int. Cl.
*B23K 26/02*  (2006.01)
*B23K 26/08*  (2006.01)

(52) U.S. Cl. ........................... 219/121.78; 291/121.81; 291/121.68

(58) Field of Classification Search ........... 219/121.68, 219/121.67, 121.78, 121.79, 121.8, 121.81
See application file for complete search history.

(56) References Cited

U.S. PATENT DOCUMENTS

| 4,693,567 | A | * | 9/1987 | Ozaki | .......................... 359/710 |
| 6,035,757 | A | * | 3/2000 | Caluori et al. | ................. 83/520 |
| 6,178,649 | B1 | * | 1/2001 | Wu | ............................. 33/286 |
| 6,568,094 | B1 | * | 5/2003 | Wu | ............................. 33/281 |
| 6,782,034 | B1 | * | 8/2004 | Li | ............................... 372/109 |

* cited by examiner

*Primary Examiner*—M. Alexandra Elve

(57) ABSTRACT

An optical marking apparatus includes: a laser illuminator mounted in a housing for emitting a laser optical line for marking purpose, and an angle-variating device provided in the housing; whereby upon an angular rotation of the apparatus, the laser illuminator will outwardly project a laser line which is angularly corresponding to the rotating angles of the apparatus, thereby producing angle-variable laser lines for angular marking uses.

16 Claims, 6 Drawing Sheets

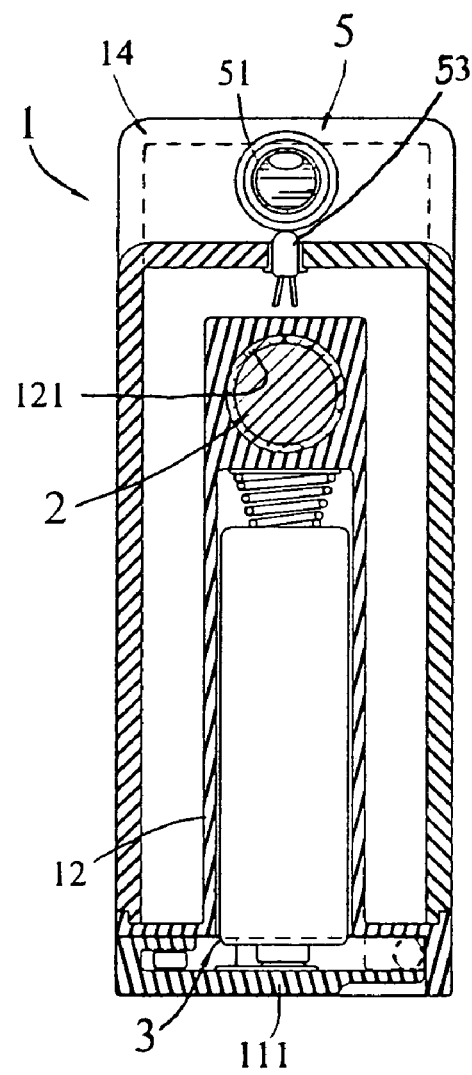
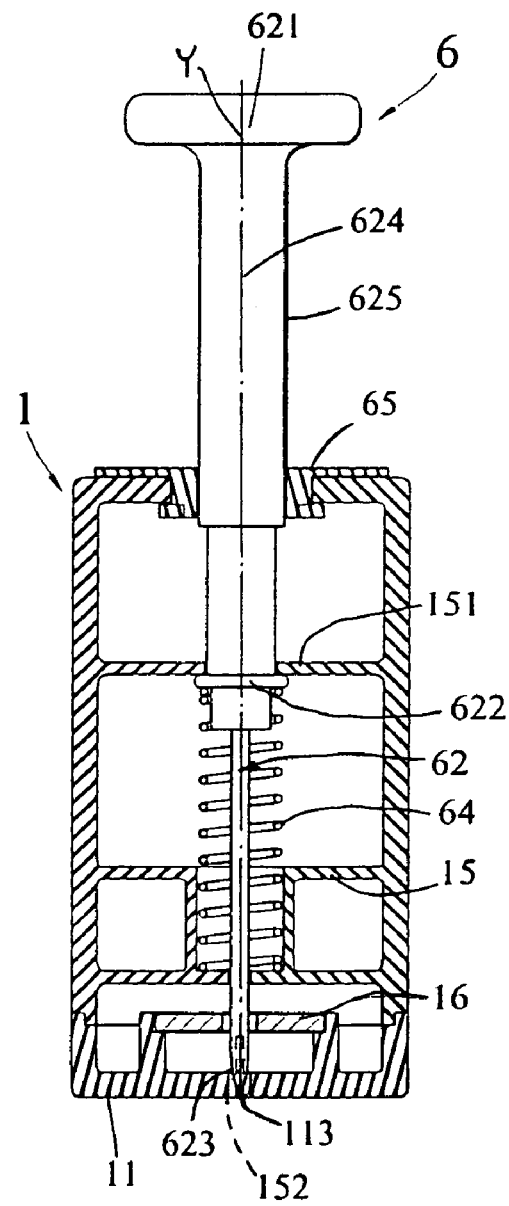
Fig. 3
Fig. 4

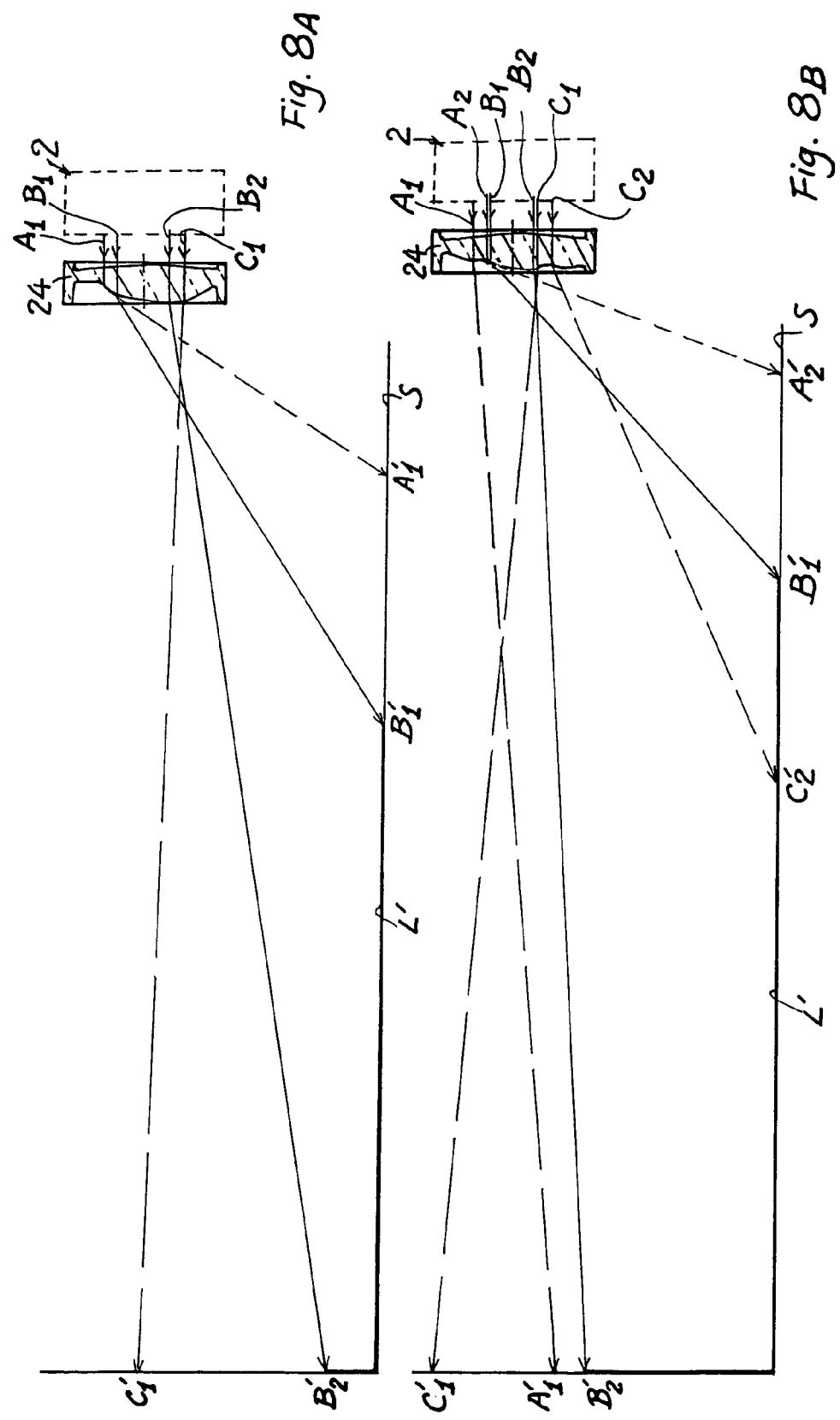

ANGLE-VARIABLE OPTICAL MARKING APPARATUS

BACKGROUND OF THE INVENTION

U.S. Pat No. 4,693,567 to Yasuto Ozaki disclosed an apparatus for projecting luminous lines on an object by a laser beam. Reviewing FIG. 5 of this prior art, a horizontal and a vertical line is projected to an object for marking purpose. However, it lacks of any angle-variation mechanism for optionally changing the angles of the projecting laser lines, thereby limiting its utility or function.

The present inventor has found this fact and invented the present optical marking apparatus for varying marking angles.

SUMMARY OF THE INVENTION

The object of the present invention is to provide an optical marking apparatus including: a laser illuminator mounted in a housing for emitting a laser optical line for marking purpose, and an angle-variating device provided in the housing; whereby upon an angular rotation of the apparatus, the laser illuminator will outwardly project a laser line which is angularly corresponding to the rotating angles of the apparatus, thereby producing angle-variable laser lines for angular marking uses.

BRIEF DESCRIPTION OF THE DRAWINGS

FIG. 3 is a sectional drawing of the present invention when viewed from Line 3—3 of FIG. 2.

FIG. 4 is a sectional drawing of the present invention when viewed from Line 4—4 of FIG. 2.

FIG. 8A is an illustration showing the optical lines projected from the laser illuminator through a lens.

FIG. 8B shows another lens as modified from FIG. 8A.

DETAILED DESCRIPTION

Figure 1:
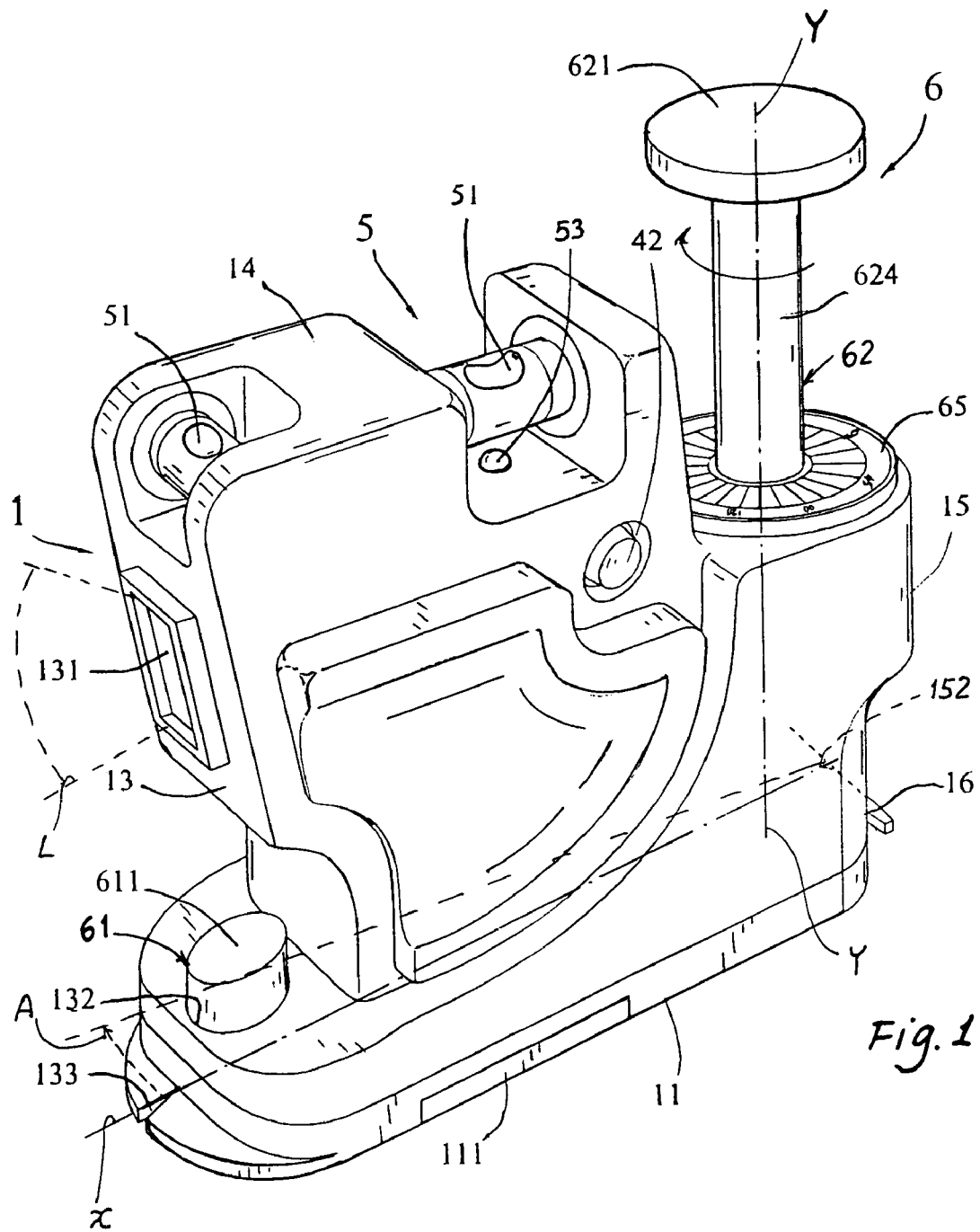
FIG. 1 is a perspective view of the present invention.

As shown in the drawing figures, the present invention comprises: a housing 1, a laser illuminator 2, a power source 3, a control means 4, a levelling means 5, and an angle-variating means 6.

The housing 1 is formed by combining a pair of half shells, and includes: a bottom plate 11, an illuminator holder 12 protruding upwardly from the bottom plate 11 for mounting the laser illuminator 2 thereon, and a chamber 120 formed in the holder 12 for storing a plurality of batteries of the power source 3 having a bottom cover 111 covering the chamber 120.

The laser illuminator 2 includes a lens device 24 which includes at least a lens, or a cylindrical-surfaced lens formed in front of the laser illuminator 2 and an integrated circuit 27 including a laser diode for energizing the laser illuminator 2 for emitting a laser optical line outwardly through an opening (or window) 131 formed in a front wall 13 of the housing 1.

The laser illuminator 2 is mounted in a calibrating means (or device) 20 secured in a socket 121 formed in the holder 12 within the housing 1 for calibrating a precise laser optical line projected from the laser illuminator 2.

The calibrating means 20 may be referred to U.S. Pat. No. 6,178,649 entitled "optical calibrating apparatus for emitting datum laser line" also issued to the same inventor of this application.

However, the calibrating means 20 is still described in detail hereinafter for reference.

The calibrating means 20 as shown in FIGS. 5~9 includes: an eccentric adjusting sleeve 21 disposed around the laser illuminator 2, an inner inclined adjusting sleeve 22 disposed around the eccentric adjusting sleeve 21, a jacket 23 having the lens 24 secured in a recess 231 formed in a front portion of the jacket 23 and having an inside hole 232 for engaging the inner inclined adjusting sleeve 22 in the inside hole 232 in the jacket 23, an outer inclined adjusting sleeve 25 having an inner hole 251 engaged with the jacket 23, and a cylindrical casing 26 disposed around the outer inclined adjusting sleeve 25 and secured in a socket 121 formed in the holder 12 within the housing 1.

Figure 7:
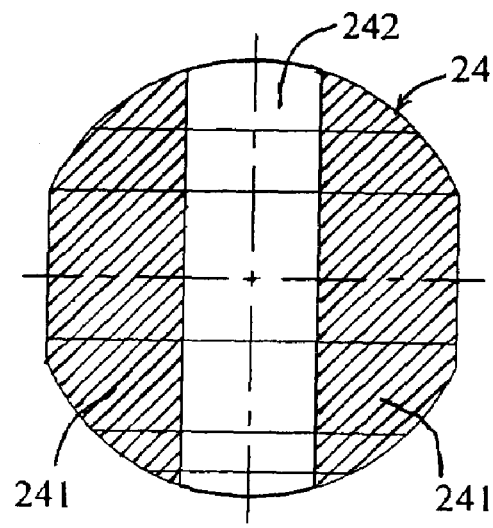
FIG. 7 is a front view of the lens of the laser illuminator of the present invention.
Figure 9:
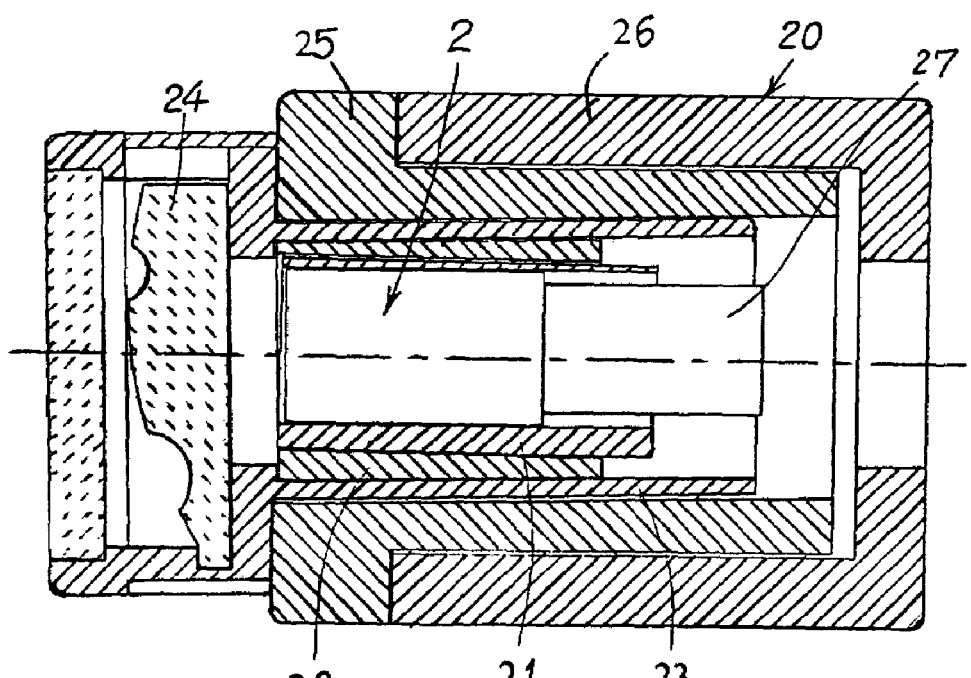
FIG. 9 shows an assembly of the laser illuminator with the calibrating device of the present invention.

The lens 24 may be a cylindrical-surfaced lens, but not limited in the present invention. As shown in FIG. 7, a central transparent zone 242 is formed on the lens having a pair of opaque shields 241 disposed on a left and right side of the central transparent zone 242, thereby allowing the laser optical line projecting outwardly through the central transparent zone 242 on the lens 24. The central transparent zone 242 as shown in FIG. 7 is formed as a vertical shape to project a laser optical line vertically accordingly.

The control means 4 includes a control circuit 41 formed on the holder 12 and electrically connected to the integrated circuit 27 of the laser illuminator 2 and electrically connected to a pair of bulbs 53 of the levelling means 5, and a switch or control button 42 formed on the housing 1 for switching on or off the laser illuminator 2 and the bulbs 53 of the levelling means 5.

The levelling means 5 includes two bubble levelers 51, 51 formed on a top portion 14 of the housing 1, with the two bubble levelers 51, 51 orienting to be perpendicular with each other for checking the horizontality of the apparatus when the bottom plate 11 (or the apparatus) is placed on a horizontal plane or the bottom plate 11 (or the apparatus) is horizontally positioned.

Upon switching on the power source 3, the laser illuminator 2 will be powered to emit a laser optical line and the bulbs 53 will also be lit for a clear observation of the two bubble levelers 51, 51 of the levelling means 5. When assembling the apparatus of this invention, the inner and outer inclined adjusting sleeves 22, 25 of the calibrating means 20 may be rotated until the emitted laser line is aligned with a standard laser line from a standard optical calibrator or aligned with a mark preset by a standard instrument to thereby calibrate the laser illuminator 2. Accordingly, the laser illuminator 2 after being calibrated will reliably project a laser optical line L through the opening or window 131 for marking purpose. A front pointer (or indicator) 133 and a rear pointer (or indicator) 152 are respectively formed on a front and a rear end of the bottom plate 11 of the apparatus, both pointers 133, 152 being linearly linked (X) to be projectively aligned with a laser optical line as projected from the laser illuminator 2. Each pointer 133 or 152 may be formed as a V-shaped notch cut in the bottom of the housing 1.

The angle-variating means 6 includes: a front positioning device 61 formed on a front portion of the housing 1, and a fulcrum positioning device 62 formed on a rear portion of the housing 1, and an angle-indicating disk 65 disposed about the fulcrum positioning device 62, whereby upon an angular rotation of the front positioning device 61 about a fulcrum axis Y in the fulcrum positioning device 62 in an angle as shown in the angle-indicating disk 65, a laser optical line will be projected outwardly from the laser illuminator 2 to be deviated in the same angle from that as originally projected from the illuminator 2.

The front positioning device 61 includes: a needle (or nail) 613 inserted into an object to be marked through a needle hole 112 formed in the front portion of the housing 1, a depression button 611 formed on a top of the needle 613 through a button hole 132 formed in the front wall 13, a tension spring 63 retained between the depression button 611 and the bottom plate 11 of the housing 1 to resiliently restore the depression button 611 upwardly having a flange 612 formed on the depression button 611 to be upwardly limited by the button hole 132, whereby upon an angular rotation of the front positioning device 61 to a desired position, the depression button 611 will be depressed downwardly for inserting the needle 613 into the object for fixing the apparatus of the present invention on the object.

The fulcrum positioning device 62 includes: a fulcrum needle (or nail) 623 inserted into the object through a rear needle hole 113 formed in a rear portion of the bottom plate 11 and defining a fulcrum axis Y perpendicular to the bottom plate 11 of the housing 1 and axially formed in a center of the angle-indicating disk 65, a stem 624 axially connected on a top of the fulcrum needle 623, and a restoring spring 64 resiliently tensioning the stem 624 upwardly to be ready for a downward depression of the stem 624 to downwardly insert the fulcrum needle 623 into the object to serve as a fulcrum for the angular rotation of the front positioning device 61 of the angle-variating means 6.

The fulcrum positioning device 62 has the stem 624 formed with a depression knob 621 on a top of the stem 624, and an alignment mark 625 formed on the stem 624 to indicate the rotating angles (degrees) as shown on the angle-indicating disk (or scale) 65.

The stem 624 has a retainer ring 622 formed on a lower portion of the stem 624 to be upwardly urged by the restoring spring 64 as retained between a limiting plate 151 and a bottom portion in a rear portion of the housing 1.

A hanger 16 is formed on a central rear portion of the rear wall 15, having a center of the hanger 16 projectively aligned with the fulcrum axis Y of the fulcrum positioning device 62 so that the housing 1 can be gravitationally hanged on an object wall for marking purpose.

The bottom plate 11 or bottom of the housing 1 includes the front pointer 133 and the rear pointer 152, both pointers 133, 152 linearly linked to extrapolatively define a base reference line X to be perpendicularly intersected with the fulcrum axis Y of the fulcrum positioning device 62 (FIGS. 1 and 2), and upon an indication of zero degree on the angle-indicating disk 65 by the alignment mark 625 of the fulcrum positioning device 62, the base reference line X defined by the front and rear pointers 133, 152 will be projectively aligned with the laser optical line L as emitted from the laser illuminator 2.

Figure 2:
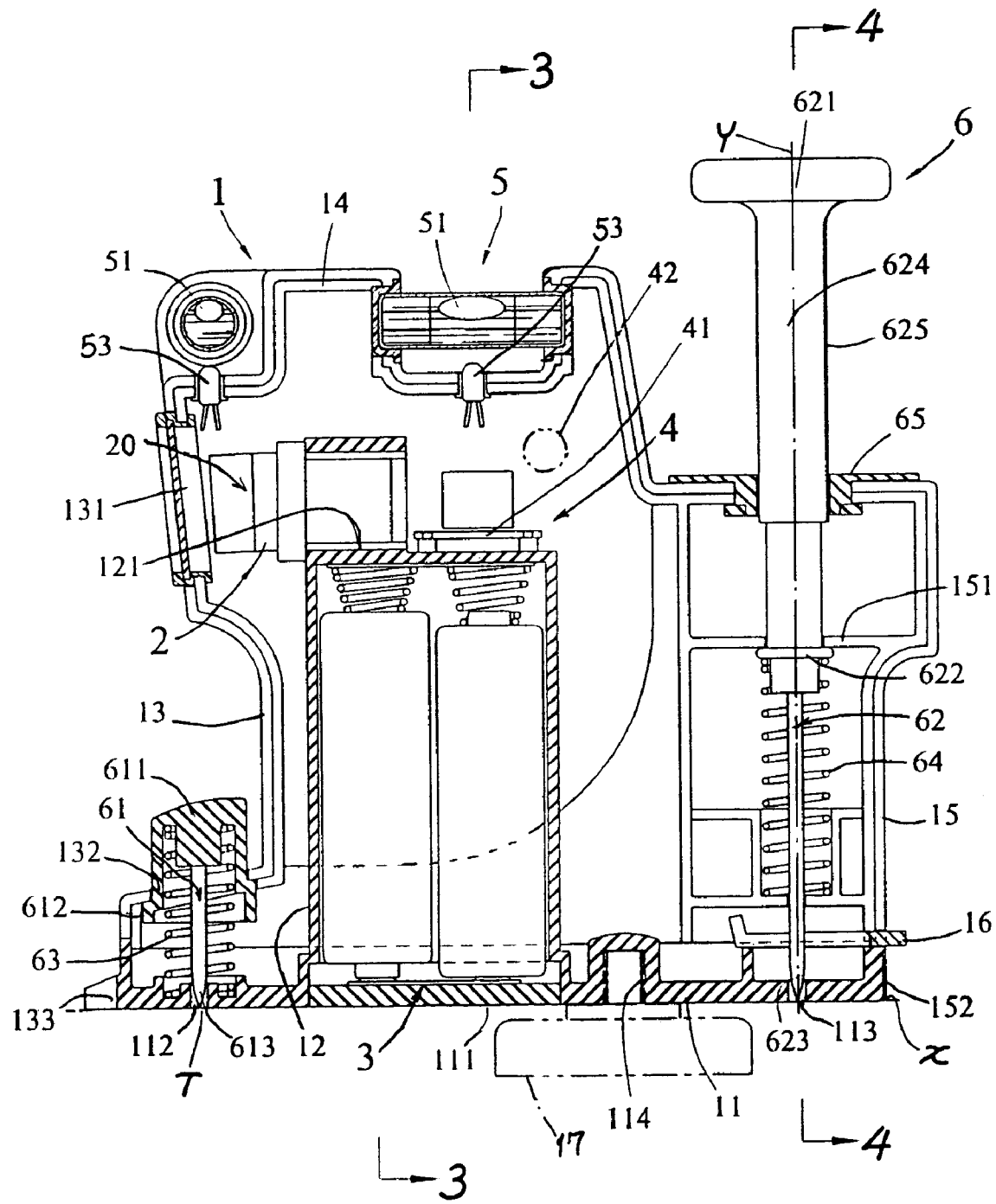
FIG. 2 is a sectional drawing of the present invention.
Figure 5:
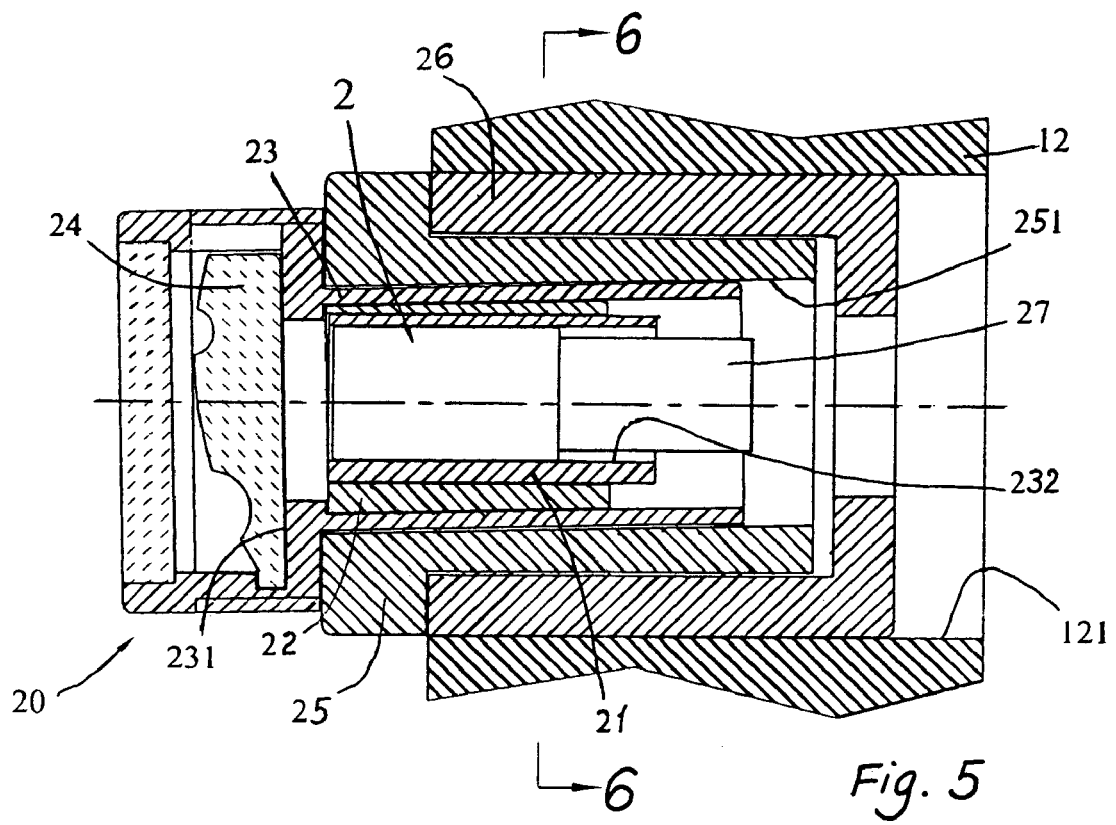
FIG. 5 is a sectional drawing showing the calibrating device of the laser illuminator of the present invention.
Figure 6:
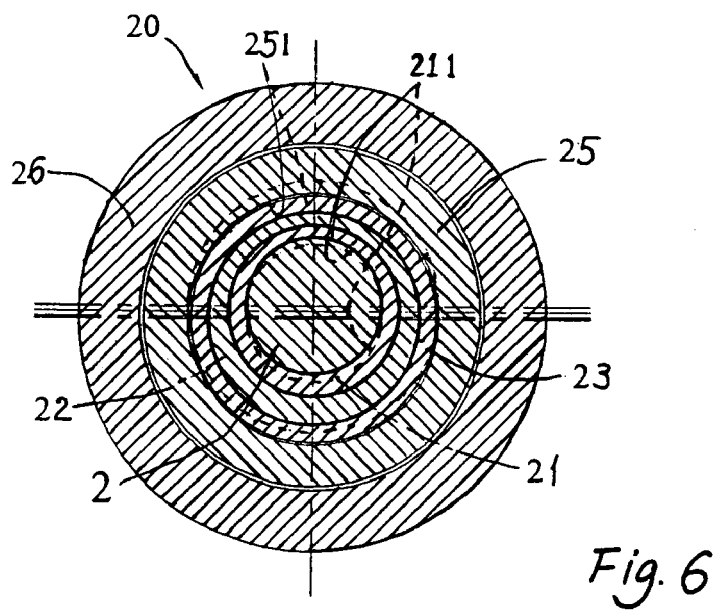
FIG. 6 is a cross sectional drawing as viewed from Line 6—6 of FIG. 5.

As shown in FIG. 2, a screw hole 114 may be formed in the bottom plate 11 of the housing 1 to be engaged with a supporting frame or tripod (not shown), or to be secured with a magnet 17 to be magnetically attracted on a ferrous object.

As shown in FIG. 1, a first laser optical line L may be projected outwardly from the laser illuminator 2 which is projectively aligned with the base reference line X defined by the front and rear pointers 133, 152, and the disk 65 is now showing zero degree. The first optical line L will serve as a first datum line, when projected on an object, for marking purpose.

The front positioning device 61 is further rotated by upwardly pulling or withdrawing the needle 613 from the object T in an angle A deviated from the original line. Then, the laser illuminator 2 will further project another optical line to be deviated from the first one in the same angle A. So, a plurality of laser optical lines can thus be obtained by angularly rotating the apparatus of the present invention for angular marking purpose.

Accordingly, the present invention provides a laser illuminator which will project laser lines about a fulcrum axis Y for an angular marking in a convenient way.

The present invention may be modified without departing from the spirit and scope of the present invention.

Either needle 613, 623 may be modified to be two parts, namely, a lower needle portion insertable into the object; and an upper needle sleeve secured in the housing 1 and detachably engaged on the lower needle portion; whereby the lower needle portion may be first inserted into a hard object by a hammer to prevent from damage to the apparatus.

As shown in FIGS. 8A, 8B, the laser beams as projected from the laser illuminator 2 will be deflected or projected through a lens 24 having small convex portions or concave portions formed on the lens so as to be strongly projected towards a base surface or front surface S in front of the laser illuminator 2 for forming clear laser optical line image L' on the surface S for marking or alignment purpose.

The numerals $A_1$, $B_1$, $B_2$ and $C_1$ in FIG. 8A and numerals $A_1$, $A_2$, $B_1$, $B_2$, $C_1$ and $C_2$ in FIG. 8B respectively indicate the incoming laser lines projected into the lens 24; while the numerals $A_1'$, $B_1'$, $B_2'$, and $C_1'$ in FIG. 8A and numerals $A_1'$, $A_2'$, $B_1'$, $B_2'$, $C_1'$ and $C_2'$ in FIG. 8B respectively indicate the laser optical liens being deflected and projected to be displayed on the base surface or front surface S as laser line image.

I claim:

1. An optical marking apparatus comprising:
    a housing having a power source provided therein;
    a laser illuminator mounted in said housing and operatively projecting a laser optical line outwardly from said housing on an object to be marked; and
    an angle-variating means formed in said housing;
    said angle-variating means including: a front positioning device formed on a front portion of the housing, and a fulcrum positioning device formed on a rear portion of the housing, and an angle-indicating disk disposed about the fulcrum positioning device, whereby upon an angular rotation of the front positioning device about a fulcrum axis in the fulcrum positioning device in an angle as shown in the angle-indicating disk, a laser optical line will be projected outwardly from the laser illuminator to be deviated in said angle from a laser optical line as originally projected from the illuminator for an angular marking on the object.

2. An optical marking apparatus according to claim 1, wherein said housing includes: a bottom plate, an illuminator holder protruding upwardly from the bottom plate for mounting the laser illuminator thereon, and a chamber formed in the holder for storing a plurality of batteries of the power source and having a bottom cover covering the chamber.

3. An optical marking apparatus according to claim 1, wherein said laser illuminator includes a lens device having at least a lens formed in front of the laser illuminator and an integrated circuit including a laser diode for energizing the laser illuminator for emitting a laser optical line outwardly through an opening formed in a front portion of the housing.

4. An optical marking apparatus according to claim 2, wherein said laser illuminator is mounted in a calibrating means secured in a socket formed in the holder within the housing for calibrating a laser optical line projected from the laser illuminator.

5. An optical marking apparatus according to claim 4, wherein said calibrating means includes: an eccentric adjusting sleeve disposed around the laser illuminator, an inner inclined adjusting sleeve disposed around the eccentric adjusting sleeve, a jacket having a lens secured in a recess formed in a front portion of the jacket and having an inside hole for engaging the inner inclined adjusting sleeve in the inside hole in the jacket, an outer inclined adjusting sleeve having an inner hole engaged with the jacket, and a cylindrical casing disposed around the outer inclined adjusting sleeve and secured in the socket formed in the holder within the housing.

6. An optical marking apparatus according to claim 3, wherein said lens device includes a cylindrical-surfaced lens and a lens for projecting laser optical line towards a front surface or base surface in front of said illuminator.

7. An optical marking apparatus according to claim 3, wherein said lens includes a central transparent zone formed on the lens having a pair of opaque shields disposed on a left and right side of the central transparent zone, thereby allowing the laser optical line projecting outwardly through the central transparent zone on the lens.

8. An optical marking apparatus according to claim 1, wherein said housing includes a levelling means having two bubble levelers formed on a top portion of the housing, with the two bubble levelers orienting to be perpendicular with each other for checking horizontality of the apparatus when horizontally positioned.

9. An optical marking apparatus according to claim 1, wherein said housing includes a front pointer and a rear pointer respectively formed on a front and a rear end of the bottom plate of the apparatus, both said pointers linearly linked to be projectively aligned with a laser optical line as projected from the laser illuminator.

10. An optical marking apparatus according to claim 1, wherein said front positioning device includes: a front needle inserted into an object to be marked through a needle hole formed in the front portion of the housing, a depression button formed on a top of the needle through a button hole formed in the front wall, a tension spring retained between the depression button and the bottom plate of the housing to resiliently restore the depression button upwardly having a flange formed on the depression button to be upwardly limited below the button hole, whereby upon an angular rotation of the front positioning device to a desired position, the depression button will be depressed downwardly for inserting the needle into the object for fixing the apparatus on the object.

11. An optical marking apparatus according to claim 1, wherein said fulcrum positioning device includes: a fulcrum needle inserted into the object through a rear needle hole formed in a rear portion of the bottom plate and defining said fulcrum axis perpendicular to the bottom plate of the housing and axially formed in a center of the angle-indicating disk, a stem axially connected on a top of the fulcrum needle, and a restoring spring resiliently tensioning the stem upwardly to be ready for a downward depression of the stem to downwardly insert the fulcrum needle into the object to serve as a fulcrum for the angular rotation of the front positioning device of the angle-variating means.

12. An optical marking apparatus according to claim 11, wherein said fulcrum positioning device has the stem formed with a depression knob on a top of the stem, and an alignment mark formed on the stem to indicate the rotating angles as shown on the angle-indicating disk.

13. An optical marking apparatus according to claim 11, wherein said stem has a retainer ring formed on a lower portion of the stem to be upwardly urged by said restoring spring retained between a limiting plate and a bottom portion in a rear portion of the housing.

14. An optical marking apparatus according to claim 11, wherein said housing includes a hanger formed on a central rear portion of a rear wall of the housing, having a center of the hanger projectively aligned with the fulcrum axis of the fulcrum positioning device to allow the housing to be gravitationally hanged on an object wall for marking.

15. An optical marking apparatus according to claim 1, wherein said housing includes a front pointer and a rear pointer linearly linked to extrapolatively define a base reference line to be perpendicularly intersected with said fulcrum axis of said fulcrum positioning device, and upon an indication of zero degree on the angle-indicating disk by the alignment mark of the fulcrum positioning device, the base reference line defined by the front and rear pointers will be projectively aligned with the laser optical line as emitted from the laser illuminator.

16. An optical marking apparatus according to claim 1, wherein said housing includes a screw hole formed in a bottom of the housing to be engaged with a supporting frame, or to be secured with a magnet to be magnetically attracted on a ferrous object.

* * * * *